United States Patent [19]

Fowler

[11] 3,847,260

[45] Nov. 12, 1974

[54] CONVEYER BELT ROLLER

[76] Inventor: Arthur G. Fowler, 15628 Cordary Ave., Lawndale, Calif. 90260

[22] Filed: July 9, 1973

[21] Appl. No.: 377,736

Related U.S. Application Data

[63] Continuation-in-part of Ser. No. 202,930, Nov. 29, 1971, abandoned.

[52] U.S. Cl. ............... 193/37, 29/116 R, 29/124, 29/130, 29/132, 198/129, 226/191
[51] Int. Cl. ............................................ B65g 39/04
[58] Field of Search ...... 198/129; 193/37; 29/116 R, 29/117, 124, 125, 129, 130, 132; 226/191, 15

[56] References Cited
UNITED STATES PATENTS

| | | | |
|---|---|---|---|
| 1,394,684 | 10/1921 | Matsuo | 29/132 |
| 2,644,575 | 7/1953 | Mercier | 29/116 R |
| 3,462,058 | 8/1969 | Redman | 226/191 |

FOREIGN PATENTS OR APPLICATIONS

| | | | |
|---|---|---|---|
| 1,042,987 | 9/1966 | Great Britain | 29/132 |
| 1,099,897 | 3/1955 | France | 193/37 |
| 844,210 | 8/1960 | Great Britain | 193/37 |

*Primary Examiner*—Evon C. Blunk
*Assistant Examiner*—Jeffrey V. Nase
*Attorney, Agent, or Firm*—John Holtrichter, Jr.

[57] ABSTRACT

A cylindrical roller rotatably supported on a stationary shaft and used as an idler in a conveyer belt arrangement, the roller including an end bearing supported relatively thick cylinder of a ceramic material with a very hard and smooth outer surface for contacting the conveyer belt, the roller being in the form of either a single elongated ceramic cylinder supported at its ends by end bearings, or a single elongated ceramic cylinder mounted on an end bearing supported steel sleeve, or a plurality of spaced relatively shorter elongated ceramic segments mounted on an end bearing supported steel sleeve or tube.

4 Claims, 6 Drawing Figures

PATENTED NOV 12 1974 3,847,260

CONVEYER BELT ROLLER

This is a continuation-in-part application of patent application Ser. No. 202,930 filed Nov. 29, 1971, now abandoned.

BACKGROUND OF THE INVENTION

The background of the invention will be set forth in two parts.

FIELD OF THE INVENTION

The present invention pertains generally to the field of conveyers and more particularly to a roller used as an idler in a conveyer belt system.

DESCRIPTION OF THE PRIOR ART

The art of conveyor belt idler rollers has been known for many hundreds of years and although many advances have taken place over this span of time, there are still formidable problems present which cause the loss of much time and materials in any industry which utilizes these systems.

The first known devices designed for this use were constructed entirely of wood and wood laminates with hardwood axles. Later, iron and steel sleeves were inserted within wooden rollers and metal bearings were provided. This fairly well satisfied the requirements and demands for a time, but as industry progressed and loads became heavier and belt travel speed increased, these devices tended to break down sooner than what was considered desirable.

The art finally progressed to utilizing elongated steel cylinders supported at their ends by roller or ball bearing units on steel axles. The steel cylinders, it was assumed, would be strong enough to withstand the severe abrasive action of a moving conveyer belt which rode on these rollers, and to withstand the severe shock of non-uniform heavy loads being carried by these arrangements. Over the years, it has been learned that with higher and higher belt speeds, belt loads and tougher belt materials, there is a great tendency for the steel rollers to wear severely on their cylindrical surface and to finally collapse and disintegrate. This failure is usually accompanied by a cutting and demolishing of a very expensive conveyer belt.

An analysis of this problem reveals that the life of subh steel rollers is severely and detrimentally affected by the abrasiveness of the belting material, any foreign material which happens to adhere to the steel surface, such as for example magnetized metal filings, and especially by metal belt fasteners which are used to connect the ends of the belt together. Also, corrosiveness of the atmosphere in the area of these rollers and extreme temperature variations tend to weaken and appreciably lessen the life of these units. Possibly the most severe problem involved with roller failure is not the cost of the roller replacement, but is the cost to the user by the "down-time" of a conveyer when it cannot be used. This down-time cost is greatly increased where the belt itself has been ruined by the jagged edges of a collapsed steel roller; not to mention the very high cost of belt replacement.

Over the years, the art has taken steps to overcome this problem with the use of steel rollers. One technique has been to log the time of use for each such roller and replace it after a predetermined period of time which experience has taught will reduce the probability of roller failure. Extremely expensive precautions have also been initiated to isolate the area under the moving belt from dust and filings so that the contamination problem can be lessened. However, this technique has never been very successful. Regular and extensive visual inspections have also been made, but roller wear is not always patently visible to the eye, and this scheme requires many man hours of labor.

The use of rollers having other than wood or steel surfaces has also long been known, but for one reason or another they have not been used by those skilled in the art as idlers in conveyer belt systems. For example, a clay roller was used over a hundred years ago to replace wood or steel in mill rollers and in roller presses in paper making machinery and the like. Pattern producing and engraving rollers have also utilized hardened glazed glass surfaces where highly corroding chemicals were present; this to prevent severe chemical reaction with metal rollers. Asbestos laminated rollers have also found use in furnace roller applications where steel rollers would not survive the extremely high temperatures involved. Further, these special rollers include liquid coolant conveyed axles to help conduct heat away from critical areas.

In steel sheet and bar fabrication plants, it has been found that rollers which support the nearly molten metal directly on their cylindrical surfaces should not be constructed of steel, for long life results. Instead, this industry has turned to the use of asbestos materials which are essentially impervious to the extremely high continuous temperatures of up to 2000°F., and generally corrosive atmosphere. These rollers are composed of a plurality of annular discs of asbestos millboard compressed together axially on a shaft. The oxides of the asbestos and the binder material in the millboard are caused to fuse into a continuous shell of a ceramic nature by heating of this surface and provide the required strong and heat resistant characteristics needed.

Thus, it can be seen that ceramic type materials have been used in certain roller applications, but it is to be pointed out that because of certain prejudices in the art these materials have not been utilized in rollers for conveyer belt idler applications. These prejudices probably center about the long held belief that since ceramic materials are in many ways similar in characteristic to glass they would not have the strength and toughness required for use as idlers to support heavily and many times non-uniformly loaded high-speed conveyer belts. This prejudice is well entrenched in the conveyer belt are as evidenced by the fact that even though such materials have been used in mill rollers, etc., for over one hundred years, they have not to date been incorporated in conveyer belt applications.

In contravention to this strictly and uniformly held prejudice against the use of ceramic rollers as idlers in conveyer belt systems, there will herein be described several embodiments of an important invention which does utilize this material in such applications with remarkably advantageous results.

SUMMARY OF THE INVENTION

In view of the foregoing factors and conditioning characteristic of the prior art, it is a primary object of the present invention to provide a new and a useful conveyer belt roller which overcomes the disadvantages of the prior art.

It is another object of the present invention to provide a strong and rugged conveyer belt roller which has an extremely smooth and long wearing cylindrical surface.

It is also another object of the present invention to provide a low cost conveyer belt roller which will not cut or rip conveyer belts and which is susceptible to various forms depending on the type of belt load.

It is yet another object of the present invention to provide a conveyer belt roller which has extremely long life, is abrasive resistant, incombustible and not susceptible to rusting.

It is a further object of the present invention to provide an easily installed conveyer belt roller which is impervious to acids, grease, oil, water, and electrolysis, and which will not develop holes in its extremely smooth glazed surface.

According to the present invention, a conveyer belt system incorporting idler holding brackets mounted on a conveyer frame is provided including an endless conveyer belt, an elongated stationary roller shaft having ends supported by the holding brackets, a pair of end bearings mounted on the stationary roller shaft adjacent the shaft ends, and a relatively thick cylinder of solid ceramic material with an inner cylindrical surface and a glazed outer cylindrical surface adapted to movably support the conveyer belt, the cylinder being supported by the end bearing rotatably with respect to the stationary roller shaft.

In accordance with a presently preferred embodiment of the invention, a plurality of relatively thick cylinders of solid ceramic material are mounted by resilient means on an elongated steel sleeve that is fixedly supported adjacent its ends on an outer rotatable portion of the end bearings. The resilient means may be generally in the form of a cylinder having a plurality of elongated ribs symmetrically located about its inner surface, the outer surface of the resilient cylinder being in contact with the inner surface of the ceramic cylinders and the ribs being in compressive contact with the outer surface of the steel sleeve for significantly reducing the effect of shock forces on the ceramic cylinders due to shock loads incident on the conveyer belt.

Figure 1:
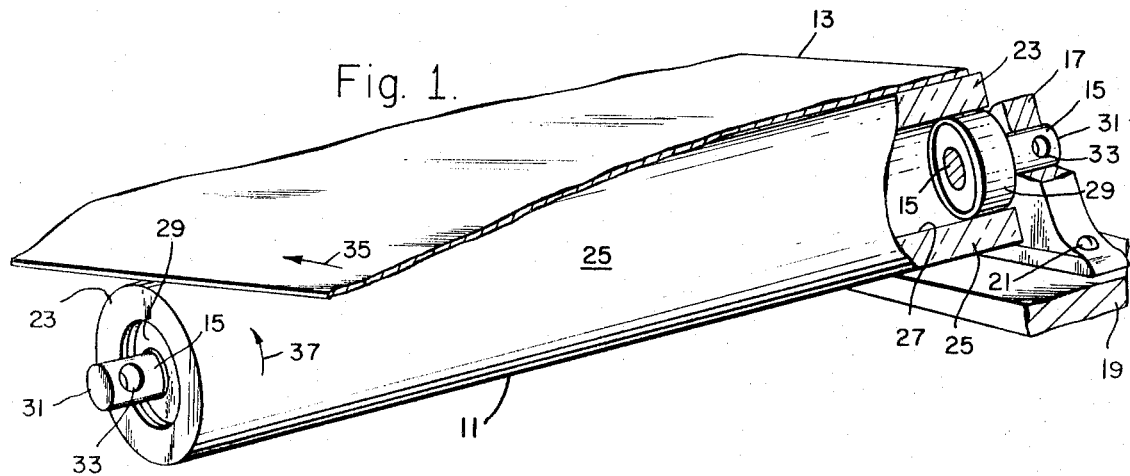
FIG. 1 is a perspective view of a conveyer belt roller constructed in accordance with one embodiment of the present invention.

DESCRIPTION OF THE INVENTION:

Referring now to the drawing and more particularly to FIG. 1, there is shown a conveyer belt roller 11 supporting a conveyer belt 13, a stationary shaft 15 of the roller 11 being held by hangers or brackets 17 (only one shown) mounted on a conveyer frame 19 by the use of any conventional attachment means such as bolts 21, for example.

The roller 11 in this embodiment includes an elongated, relatively thick, cylinder 23 of solid ceramic material, to be described later. The roller's outer cylindrical surface 25 is glazed to be very smooth and extremely hard and its inner surface 27 accommodates and is bonded to a pair of conventional end bearings 29, preferably of the sealed roller or ball bearing type. The bearings in turn are fixedly mounted by pressing or other suitable means on the elongated shaft 15. As shown here, the ends 31 of the shaft 15 are circular in cross section and they may, depending upon the type of mounting to be used, be provided with holes 33.

Figure 2:
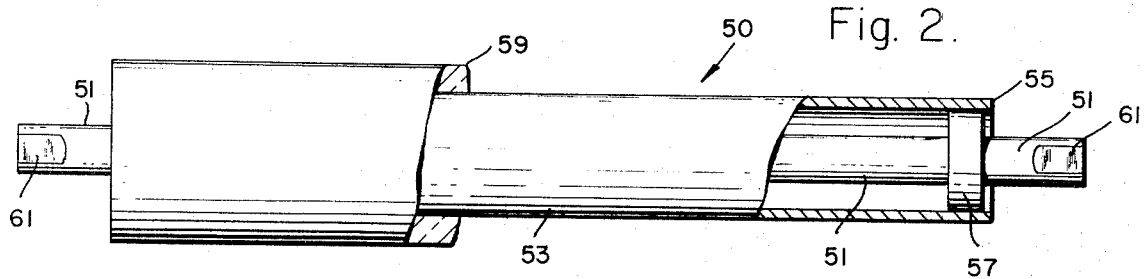
FIG. 2 is a side elevational view, partially broken away and partially in section, of another embodiment of the present invention.

In operation, the roller 11 is positioned beneath and adjacent a conventional conveyer belt 13, which is generally a rubber covered coarse fabric sometimes including a steel or nylon casing. As the belt 13 is caused to move linearly in a direction 35, the cylinder 23 of the idler roller 11 will turn accordingly in a direction 37. It has been found that under long period tests of high speed belt operation, the roller's outer surface 25 does not pit, crack, wear or cause damage to the conveyer belt, and that impurities tended to leave and not adhere to this glazed surface. It has also been found that the cylinder is essentially corrosion free and nonconductive and has a high dielectric property. Although this material had previously been considered to be too fragile for this application, it has now been established that this is not the case, and that indeed this type roller far outlasts the steel rollers used in the similar application.

Where additional roller strength is desired, a roller 50 constructed in accordance with another embodiment of the invention is illustrated in FIG. 2 may be utilized. The roller 50 includes a steel shaft 51, an elongated steel tube 53 rotatably mounted at its ends 55 by end bearings 57 (only one shown) on the shaft 51, and a relatively thick ceramic roller 59 which is similar in construction to the first described cylinder 23. The ends of the shaft 51, in this case, are shown to have parallel flattened sides 61 to accommodate another type of popular bracket fixture (not shown).

Figure 3:
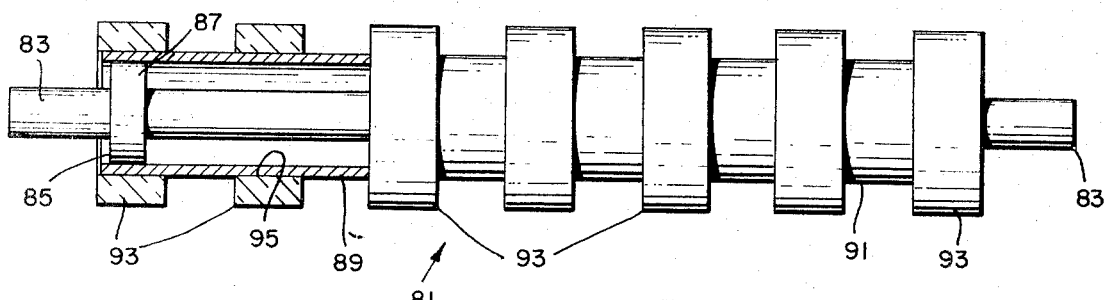
FIG. 3 is a partial sectional view, in elevation, of still another embodiment of the invention.

In still another embodiment of the present invention, shown in FIG. 3, a conveyer belt roller 81 includes an elongated shaft 83 whereon a pair of end bearings 85 are fixedly attached (only one being shown). The outer edges 87 of the bearings are pressed into or otherwise attached adjacent the ends of an elongated steel tube 89. Mounted on an outer surface 91 of the tube 89 are a plurality of similar ceramic roller segments 93 which are spaced from each other by a desired amount. Although shown in this figure as being relatively widely spaced, it should be understood that the segments 93 may be wider or narrower than those shown and they also may be spaced much closer together than illustrated. Any conventional bonding agent, such as an epoxy material, may be applied between the inner cylindrical surface 95 of the segments 93 and the outer cylindrical surface 91 of the tube 89. This same or similar type material may be used as the bonding agent to fix the ceramic cylinder 59 onto the steel tube 53 of the embodiment of FIG. 2, and also for use between the bearings 29 and the cylinder 23 of the first described embodiment.

Figure 4:
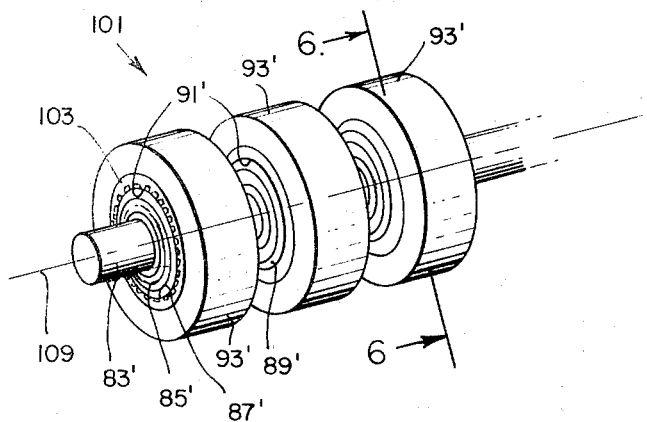
FIG. 4 is a perspective view of yet another embodiment of the invention employing resilient shock absorbing mounting means.
Figure 5:
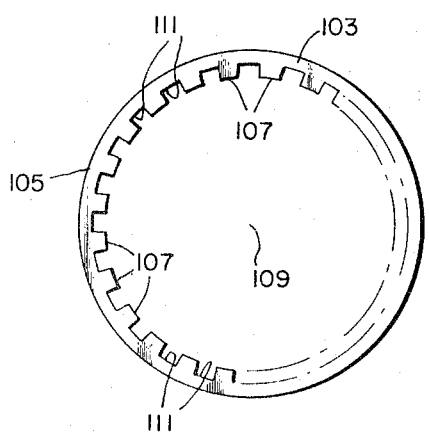
FIG. 5 is a plan view of a resilient mounting member shown in FIG. 4.
Figure 6:
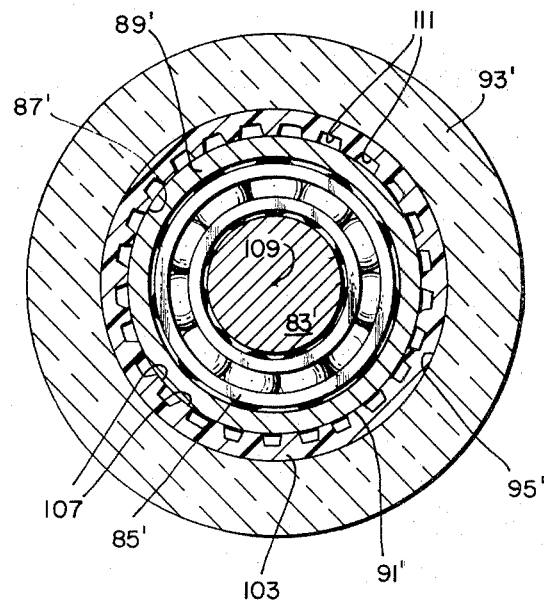
FIG. 6 is a sectional view of the embodiment shown in FIG. 5, taken along line 6—6.

A presently preferred embodiment of this invention is illustrated in FIGS. 4, 5 and 6. This embodiment, herein identified by reference numeral 101, is generally similar in construction to the roller 81 of FIG. 3 and thus includes an elongated shaft 83' whereon a pair of end bearings 85' are fixedly attached. The outer edges 87' of the bearings are pressed into or otherwise attached adjacent the ends of an elongated steel tube 89'. As shown in FIG. 4, a plurality of ceramic roller segments 93' are mounted by means of special resilient sleeves 103 on an outer surface 91' of the tube 89' in spaced apart relationship. The sleeves 103 are generally as wide as the roller segments 93' they support, but the sleeves may be wider.

FIG. 5 best illustrates the sleeve 103 configuration. It may be extruded, injection molded or otherwise fabricated from a material exhibiting a limited amount of plastic flow under extremely high temporary pressure conditions. For example, a hard rubber or plastic material such as PVC may be advantageously utilized in this application. Each of the sleeves 103 has an outer peripheral surface 105 having a diameter somewhat greater than the inside diameter of the inner cylindrical surface 95' of the segments 93', while the inner surface of the sleeve 103 consists of a plurality of elongated rib portions 107 that run parallel to the axis 109 of the sleeve.

The rib portions 107 are preferably symmetrically disposed about the axis 109 and approximately twice as high as the dimension of gaps 111 therebetween. The inwardly extending extremities of the rib portions 107 define the inside diameter of the sleeve 103, which is somewhat less than the outside diameter of the tube 89'. For example, where the inside diameter of the inner cylindrical surface 95' is 3 inches and the outside diameter of the tube 89' is 2 inches, the outside diameter of the sleeve 103 may be 3⅛ inches and its inside diameter may be 2⅛ inches. Also, the rib portions may be about ¼ inch high and about ⅛ to 3/32 inch wide with a gap dimension similar to that of the rib width.

To assemble the roller embodiment 101, the elongated shaft 81', the end bearings 85' and the elongated tube 89' are assembled in a conventional manner, as described previously. The sleeves 103 may then be pressed into the axial bore in the segments 93' by any conventional process such as a press, for example, and the sleeve fitted segments may then be placed along a front side of individual notched vertical barriers so that they are axially aligned and at predetermined spacings, as desired. The elongated tube 89' and its assemblage may then be provided with a temporary curved end cap at a leading end of the tube 89' and this end forced by conventional screw or hydraulic means serially through each of the restrained segment assemblies until all are mounted on the tube 89'. Since the barriers are notched, the completed assembly may then be lifted vertically from the jig as a finished product.

As illustrated in FIG. 6, the forcing of the tube 89' through the opening in the sleeves 103 causes the extremities 113 of the rib portions to deform and flow in a limited manner so that there is a great adhesion to the tube 89'. This procedure fixedly mounts the ceramic segments 93' to the sleeve 103 and, in turn, the sleeve to the elongated tube 89'.

From the foregoing, it should be evident that a very advantageous and novel conveyer belt roller has been described which overcomes the disadvantages of the prior art.

It should also be understood that the embodiments illustrated in the drawing are not to any scale, and that the various portions of these embodiments are not necessarily proportionally related. Further, the materials used are not critical and any material generally considered suitable for a particular application may, except for the relatively thick ceramic cylinders, be substituted for the materials specified. As to the ceramic cylinders, it has been found that a kaolin clay ceramic material has good qualities for this application and is less costly than other clay ceramics. However, any clay ceramic material which is available with a high gloss, hard finish outer surface may be utilized.

Several embodiments of the present invention have been described in detail, however, it should be clear that other embodiments of the invention may be constructed within the scope of the invention. Accordingly, it is intended that the foregoing disclosure and showings in the drawing shall be considered only as illustrations of the principles of this invention.

What is claimed is:
1. An endless conveyer belt roller, comprising:
an elongated roller shaft having supportable shaft ends;
end bearings mounted on said roller shaft adjacent said shaft ends;
an elongated metallic tube mounted on said end bearings to rotate about the longitudinal axis of said roller shaft;
a relatively thick cylinder of solid ceramic material with an inner cylindrical surface and an endless belt-supporting glazed outer cylindrical surface disposed coaxially about said roller shaft; and
mounting means including a resilient sleeve with a pressure deformable ribbed inner surface press fit between said tube and said inner cylindrical surface of said cylinder of solid ceramic material for absorbing shock energy exerted on said cylinder of solid ceramic material.

2. The endless conveyer belt roller according to claim 1, wherein a plurality of said cylinders of solid ceramic material in the form of spaced cylindrical roller segments are mounted on said tube by means of said mounting means.

3. The endless conveyer belt roller according to claim 2, wherein said ribbed inner surface includes a plurality of spaced apart rib portions of said sleeve, said rib portions being parallel to the axis of said roller segments and resiliently deformed under compressive loads between said tube and said roller segments.

4. The endless conveyer belt roller according to claim 2, wherein said resilient sleeve is extruded from plastic material and has an initial outer peripheral surface diameter greater than the inside diameter of said inner cylindrical surface of said cylinder of solid ceramic material.

* * * * *